(12) United States Patent
Goldman et al.

(10) Patent No.: US 7,352,847 B2
(45) Date of Patent: Apr. 1, 2008

(54) OPTIMIZED ROUTING OF VOIP EMERGENCY CALLS

(75) Inventors: Stuart O. Goldman, Scottsdale, AZ (US); Douglas H. Rollender, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 757 days.

(21) Appl. No.: 10/919,816

(22) Filed: Aug. 17, 2004

(65) Prior Publication Data

US 2006/0039539 A1 Feb. 23, 2006

(51) Int. Cl.
H04M 11/04 (2006.01)
(52) U.S. Cl. ............. 379/45; 379/37; 379/221.01
(58) Field of Classification Search ........... 379/37–45, 379/221.01; 370/352, 410, 401; 709/227, 709/225
See application file for complete search history.

(56) References Cited

U.S. PATENT DOCUMENTS 7,103,151 B2 * 9/2006 Lass et al. ............ 379/37

* cited by examiner

Primary Examiner—Melur Ramakrishnaiah

(57) ABSTRACT

A method for routing emergency calls is provided for emergency calls placed over a packet-switched network (310) from a Customer Premises Equipment (CPE) (110) at a remote location (100). The method includes: registering the CPE (110) with a home Internet Service Provider (ISP) (260) through a remote ISP (130) that is providing the CPE (110) access to the packet-switched network (310); determining that the CPE is at a remote location (100); obtaining a local Internet Protocol (IP) address that corresponds to a Public Safety Answering Point (PSAP) (170) serving the remote location (100); routing non-emergency calls to the home ISP (260) for call processing; and, handling emergency calls locally at the remote ISP (130) in accordance with the obtained local IP address.

17 Claims, 2 Drawing Sheets

OPTIMIZED ROUTING OF VOIP EMERGENCY CALLS

FIELD

The present inventive subject matter relates to the telecommunication arts. Particular application is found in conjunction with emergency telecommunication services (e.g., emergency 9-1-1 calls), and the specification makes particular reference thereto. However, it is to be appreciated that aspects of the present inventive subject matter are also amenable to other applications.

BACKGROUND

With reference to FIG. 1, as is known in the art, the Public Switched Telephone Network (PSTN) 10 includes mechanisms for directing certain calls, such as an enhanced emergency 9-1-1 (E 9-1-1) call, to a Public Safety Answering Point (PSAP) 20. For example, consider an end office (EO) 30 serving Customer premises equipment (CPE) 40 (i.e., a telephone or other like CPE) from which an E 9-1-1 call is placed. The EO 30 commonly includes a telecommunications switch 32 (e.g., a class 5 switch such as the Lucent Technologies 5ESS or another like switch) that is operatively connected to the CPE 40. When the switch 32 recognizes an E 9-1-1 call, the call is routed, e.g., over the PSTN 10, to the PSAP 20 serving the geographic region in which the CPE 40 is located, optionally, said PSAP 20 being designated by a directory number (DN) assigned thereto.

While only one CPE is shown, it is to be appreciated that typically a plurality of similarly situated CPE are likewise served by the EO 30 and switch 32. Optionally, if the switch 32 serves multiple CPE in different geographic regions served by different PSAPs, a selective router (SR) 34 (access via the PSTN 10) is employed to route E 9-1-1 calls to the appropriate PSAP. For example, the switch may query a localized database of the SR 34 which relates the DN of the calling CPE to the DN of the PSAP that serves the geographic region in which the CPE is located. In this manner, the E 9-1-1 calls can be directed to the appropriate PSAPs. More frequently, the EO switch may route the call to a tandem office which may then query a localized database of the SR 34 which relates the DN of the calling CPE to the DN of the PSAP that serves the geographic region in which the CPE is located. In this manner, the E 9-1-1 calls can be directed to the appropriate PSAPs.

Typically, upon receiving an E 9-1-1 call, the PSAP 20 queries an Automatic Line Identification (ALI) database (DB) using the DN of the calling CPE 40. The ALI DB provides the PSAP 20 with information associated with the DN of the calling CPE 40, such as: the geographic and/or physical location of the CPE 40 (i.e., a street address or other positional identification); optionally, any special conditions (e.g., medical conditions of the CPE's registered owner or user, repeat call patterns from the CPE 40, etc.); and/or any other such relevant information. In this manner, a proper response to the E 9-1-1 call can be quickly and readily coordinated.

One of the advantages of what is known as voice-over-packet-network telephony (which includes, but is not limited to Voice over Internet Protocol (VoIP) telephony) is the ability for "remote" users to access the PSTN through their "home" access network and/or switch. This is a beneficial arrangement since other callers can still reach the user by dialing their normal DN. For example, an individual (i.e., a remote user) that is traveling (e.g., in Cleveland, Ohio) or otherwise away from their home office or location (e.g., in Phoenix, Ariz.) may still be reached at their normal DN (i.e., their Phoenix number). Similarly, calls made by the remote user appear to come from their normal DN (i.e., their Phoenix number) and benefit from showing that DN on a caller ID. Further, the remote user has the ability to utilize any Private Branch Exchange (PBX) or Centrex features supported by the home location, home access network and/or home switch.

While generally acceptable for its intended purpose, the foregoing approach for handling emergency calls has certain drawbacks, in particular when dealing with VoIP emergency calls initiated by roaming and/or remote users. That is to say, e.g., when the aforementioned remote user is accessing the PSTN via their home access network and/or home switch in Phoenix, an E 9-1-1 call placed by the remote user would appear to be coming from their normal DN in Phoenix which is associated with their home location (i.e., Phoenix). Accordingly, the PSAP serving the home location in Phoenix would receive the E 9-1-1 call. However, the remote user is actually in Cleveland. Therefore, it would be advantageous to in fact have the E 9-1-1 call directly routed to an appropriate PSAP serving the remote user's location in Cleveland.

Accordingly, a new and improved system and/or method for handling VoIP E 9-1-1 calls is disclosed that overcomes the above-referenced problems and others.

SUMMARY

In accordance with one preferred embodiment, a method of routing emergency calls is provided for emergency calls placed over a packet-switched network from a Customer Premises Equipment (CPE) at a remote location. The method includes: registering the CPE with a home Internet Service Provider (ISP) through a remote ISP that is providing the CPE access to the packet-switched network; determining that the CPE is at a remote location; obtaining a local Internet Protocol (IP) address that corresponds to a Public Safety Answering Point (PSAP) serving the remote location; routing non-emergency calls to the home ISP for call processing; and, handling emergency calls locally at the remote ISP in accordance with the obtained local IP address.

In accordance with another preferred embodiment, a system is provided for routing emergency calls placed over a packet-switched network from a Customer Premises Equipment (CPE) at a remote location. The system includes: means for registering the CPE with a home Internet Service Provider (ISP) through a remote ISP that is providing the CPE access to the packet-switched network; means for determining that the CPE is at a remote location; means for obtaining a local Internet Protocol (IP) address that corresponds to a Public Safety Answering Point (PSAP) serving the remote location; means for routing non-emergency calls to the home ISP for call processing; and, means for handling emergency calls locally at the remote ISP in accordance with the obtained local IP address.

In accordance with yet another preferred embodiment, a method is provided for handling calls placed from an Internet Protocol (IP) telephone located at a remote location served by a first Public Safety Answer Point (PSAP) that is different from a second PSAP serving a home location. The handling includes selectively routing calls via one of a home network at the home location and a remote network at the remote location. The remote network provides the IP telephone access to an IP network linking the home and remote networks. The method includes: sending a registration message from the IP telephone through the remote network over the IP network to the home network; determining that the IP telephone is at a remote location; obtaining an IP address local to the remote location that corresponds to the first PSAP; defining a set of rules that differentiate calls into a first type of call and a second type of call; handling the first type of calls locally at the remote network in accordance with the obtained local IP address; and, routing the second type of calls to the home network for handling thereby.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components and features that are commonly known in the telecommunications art without further detailed explanation as to their configuration or operation except to the extent they have been modified or altered in accordance with and/or to accommodate the preferred embodiment(s) presented herein.

Figure 1:
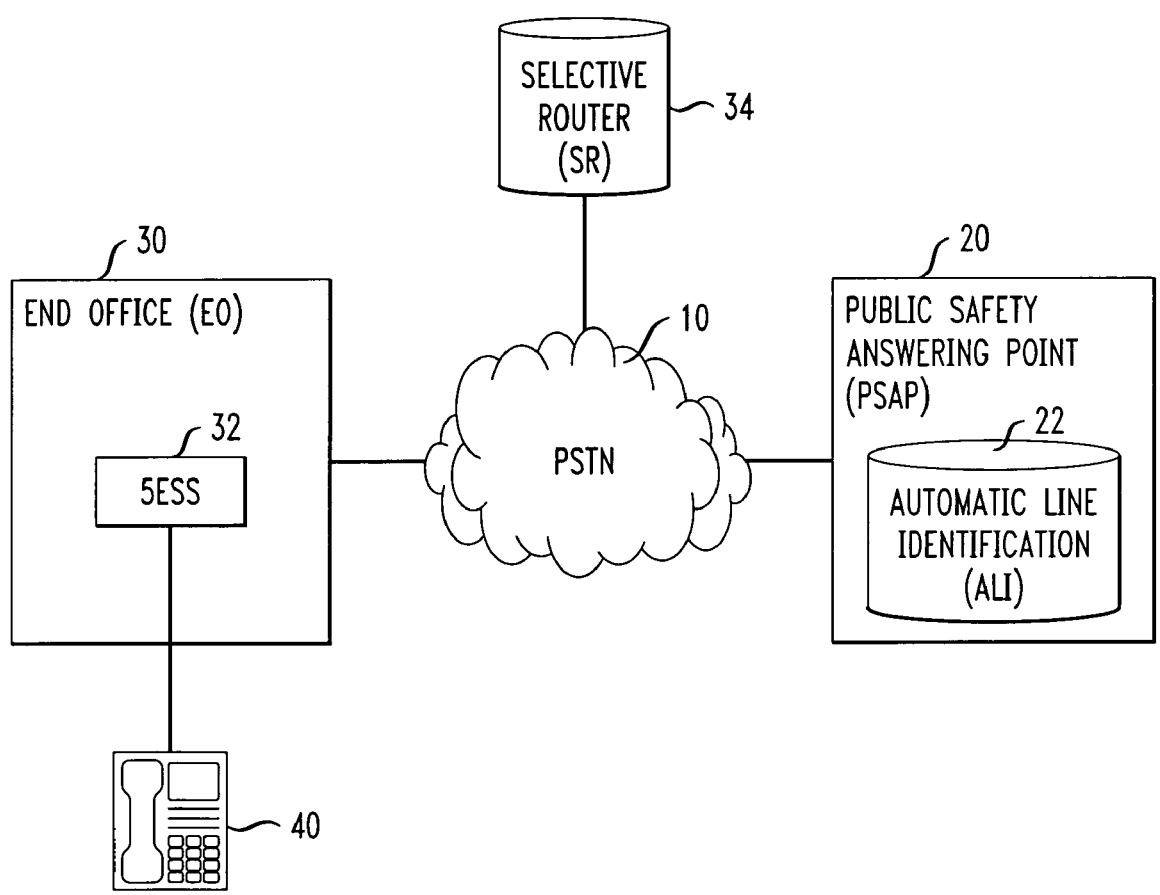
FIG. 1 is a block diagram illustrating an example of a conventional telecommunications network for handling E 9-1-1 calls.
Figure 2:
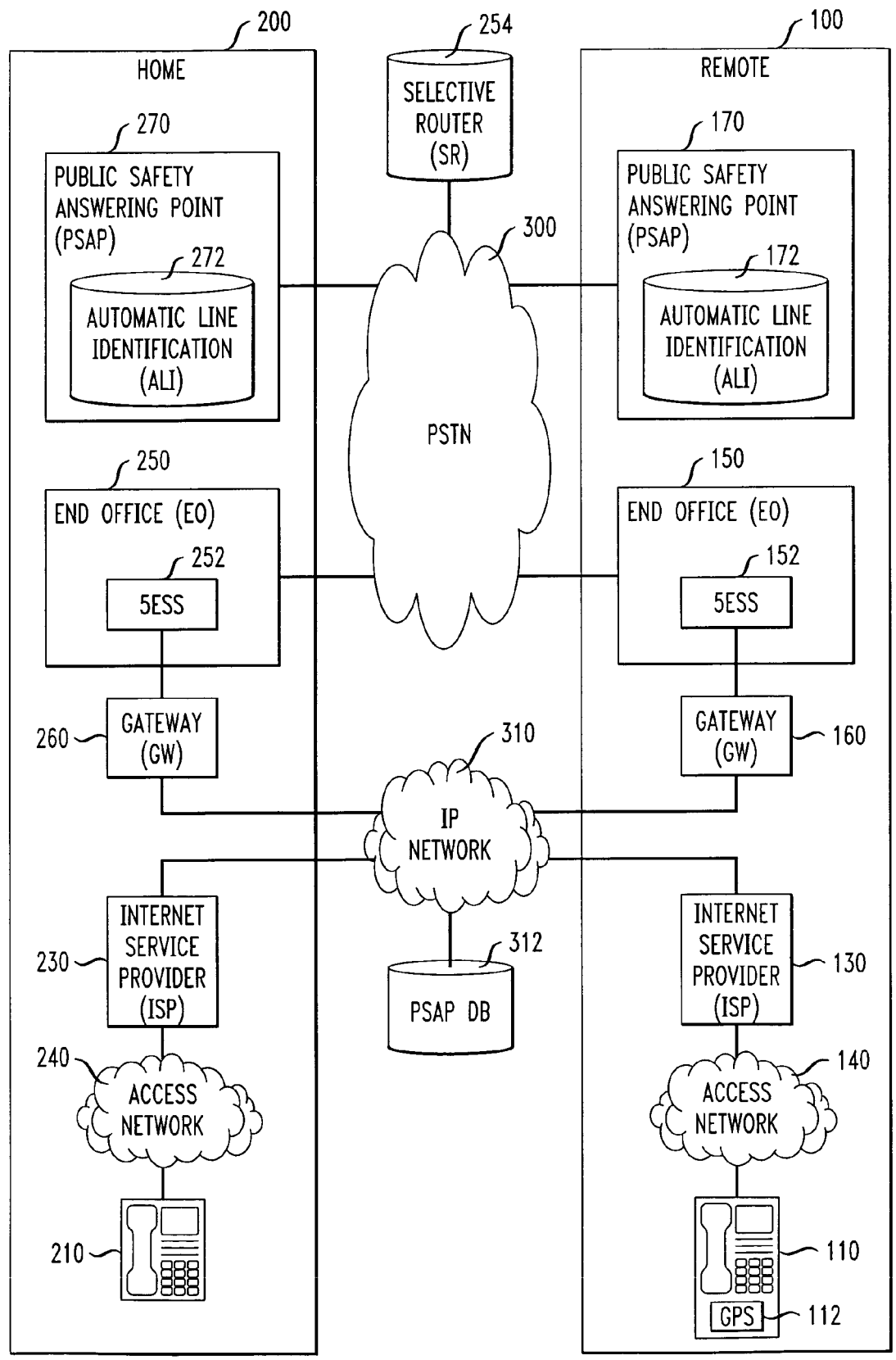
FIG. 2 is a block diagram illustrating an exemplary telecommunications network suitable for practicing aspects of the present inventive subject matter.

With reference to FIG. 2, a remote user in a remote location 100 uses customer premises equipment (CPE) 110 to selectively place telephone calls over a PSTN 300. The CPE 110, as illustrated, is an IP telephone, suitably, a hardphone or a softphone running as an application on a general purpose computer or the like. However, the CPE 110 may be any traditional IP-based CPE, e.g., used to engage in Voice over IP (VoIP), facsimile, data or other like calls.

In the usual manner, the CPE 110 operatively connects with an IP network 310, such as the Internet or another managed or unmanaged packet-switched network. Suitably, the CPE 110 is served in this capacity by a remote Internet Service Provider (ISP) 130 which is accessed from a remote access network 140, e.g., a Local Area Network (LAN), to which the CPE 110 is operatively connected in the usual manner.

When at a home location 200, the user similarly uses CPE 210 to selectively place telephone calls over the PSTN 300. As illustrated, the CPE 210 is again an IP telephone, suitably, a hardphone or a softphone running as an application on a general purpose computer or the like. However, the CPE 210 may again be any traditional IP-based CPE, e.g., used to engage in Voice over IP (VoIP), facsimile, data or other like calls. Note that suitably the CPE 210 is optionally provisioned and/or programmed with its own DN, id and/or other information from which its DN is discernable.

In the usual manner, the CPE 210 also operatively connects with the IP network 310. Suitably, the CPE 210 is served in this capacity by a home ISP 230 which is accessed from a home access network 240, e.g., a LAN, to which the CPE 210 is operatively connected in the usual manner.

Before calls are placed with the CPE 210, it is first registered with the home ISP 230. At registration, the home ISP 230 recognizes the CPE 210 as home-based insomuch as it is accessing the home ISP 230 from the home access network 240. For example, the home ISP 240 checks the originating IP address of the registering CPE 210 to determine that the CPE 210 is accessing the home ISP 230 from the home access network 240 and it is therefore in the home location 200. Accordingly, when calls are placed from the home-based CPE 210, they are routed over the home access network 240 to the home ISP 230 which recognizes from the registration that the CPE 210 is at the home location. In this case, the routing of all outgoing calls (i.e., emergency calls such as E 9-1-1 calls, and regular or non-emergency calls) are handled by the home ISP 230 so as to appear as coming from the DN of the CPE 210 which is associated with it's home location 200. Regular (i.e., non-emergency) outgoing VoIP calls are routed in the normal manner to the respective called parties, while E 9-1-1 calls are routed to a home EO 250 serving the DN of the CPE 210. Suitably, regular calls and emergency calls are differentiated from one another by the telephone number dialed.

Suitably, the home EO 250 includes a telecommunications switch 252 (e.g., a class 5 switch such as the Lucent Technologies 5ESS or another like switch) that is operatively connected to the PSTN 300 in the usual manner. An IP gateway 260 is operatively connected between the switch 252 and the IP network 310 thereby bridging the IP network 310 with the PSTN 300 in the usual manner. That is to say, the IP gateway 260 acts as a point of entry for packet-switched calls from the IP network 310 headed into the PSTN 300, and similarly acts as a point of entry for circuit-switched calls from the PSTN 300 headed into the IP network 310. In the usual manner, the IP gateway 260 selectively converts and/or translates packet-switched calls into circuit-switched calls and vice versa depending on the direction of traffic flow. Alternately, the switch 252 and gateway 260 combination is replaceable by a softswitch that acts as a functional equivalent of the combination.

When the home switch 252 recognizes the E 9-1-1 call, the call is routed, e.g., over the PSTN 300, to the home PSAP 270 serving the home location 200 in which the CPE 210 is located, optionally, said home PSAP 270 being designated by a directory number (DN) assigned thereto.

While only one home CPE is shown, it is to be appreciated that a plurality of similarly situated CPE may likewise be served by the EO 250 and switch 252. Optionally, if the switch 252 serves such multiple CPE in different geographic regions served by a plurality of different PSAPs (for simplicity, only one is shown), a selective router (SR) 254 (accessible via the PSTN 300) is employed to route E 9-1-1 calls to the appropriate PSAP. For example, the switch 252 may query a localized database of the SR 254 which relates the DN of the calling CPE to the DN of the PSAP that serves the geographic region in which the CPE is located. Alternatively, the EO switch may route the call to a tandem office which may then query a localized database of the SR 254 which relates the DN of the calling CPE to the DN of the PSAP that serves the geographic region in which the CPE is located. In this manner, the E 9-1-1 calls can be directed to the appropriate PSAPs.

Upon receiving the home-based E 9-1-1 call from the CPE 210, the home PSAP 270 queries an Automatic Line Identification (ALI) database (DB) 272 using the DN of the calling CPE 210. The ALI DB 272 provides the PSAP 270 with information associated with the DN of the calling CPE 210, such as: the geographic and/or physical location of the CPE 210 (i.e., a street address or other positional identification); optionally, any special conditions (e.g., medical conditions of the CPE's registered owner or user, repeat call patterns from the CPE 210, etc.); and/or any other such relevant information. In this manner, a proper response to the E 9-1-1 call can be quickly and readily coordinated. Notably, the geographic and/or physical location information correctly corresponds to the actual location of the CPE 210 insomuch as the call has already been established by the home ISP 230 as being made from the home location 200.

Returning attention now to the remote user using the remote CPE 110 in the remote location 100, e.g., that is geographically distinct from the home location 200 at least insomuch as it is served by a different PSAP, namely, PSAP 170. Suitably, the remote CPE 110 is also registered with the home ISP 230 before calls are placed therewith. Suitably, upon initialization of the remote CPE 110, e.g., at the time of connection to the remote access network 140, a registration message is sent from the remote CPE 110, over the remote access network 140, and through the remote ISP 130 and IP network 310 to the home ISP 230. The home ISP 230 recognizes the CPE 110 as remote-based insomuch as it is accessing the home ISP 230 from the remote access network 140. For example, the home ISP 240 checks the originating IP address of the registering CPE 110 to determine that the CPE 110 is accessing the home ISP 230 from the remote access network 140 and it is therefore in the remote location 100.

In response to the remote registration, the home ISP 230 returns to the remote ISP 130 a response that includes a local IP address (i.e., local to the remote location 100) and a set of rules that define which calls are to be handled locally (e.g., emergency calls such as E 9-1-1 calls) and which call are to be handled via the home ISP 230 (e.g., regular non-emergency calls). Suitably, the rules of one embodiment are directed to distinguishing emergency calls (to be handled locally by the remote network) from non-emergency calls (to be handle by the home network). However, it is to be appreciated that the mechanism proposed would support other applications as well, so long as a distinction between which calls are to be handle by the remote network and which calls are to be handled by the home network can be expressed in the form of a suitable rule.

Suitably, the returned IP address is obtained from a PSAP DB 312 (e.g., accessible via the IP network 310) that relates the originating IP address from the registration message with an IP address associated with the PSAP 170 serving the remote location 100. Alternately, the remote ISP 130 is provisioned with the local IP address associated with PSAP 170 serving the remote location 100. The remote ISP 130 is then simply instructed to use this IP address for handling emergency calls locally.

Optionally, the location of the remote CPE 110 is identified from the originating IP address of the registration message. In an alternate embodiment, the CPE 110 is provisioned with terminal location equipment, e.g., a global position system (GPS) 112, that identifies the location of the remote CPE 110. In either case, the identified location of the CPE 110 is used to select the appropriate local IP address for E 9-1-1 call routing to the PSAP serving the location of the CPE 110, in this case, namely the PSAP 170.

Accordingly, when a regular (i.e., a non-emergency call, e.g., as determined from the dialed telephone number) is placed from the remote CPE 110, it is routed over the IP network 310 to be handled by the home ISP 230, thereby receiving the benefits as if it were placed from the home access network 240. That is to say, in regular operation, the remote CPE 110 would appear to be at the home DN and be able to utilize any PBX or Centrex features supported at the home location 200. However, when an emergency call is placed from the remote CPE 110 (i.e., a E 9-1-1 call, e.g., as determined from the dialed telephone number), it is handled locally. For example, the remote ISP 130 uses the local IP address (e.g., the one contained in the response to the remote registration message, the one provisioned in the remote ISP 130, etc.) to route the E 9-1-1 call to the remote PSAP 170. As shown, the E 9-1-1 call is routed by the remote ISP 130 to the designated local IP address such that it proceeds through a gateway 160 (similar to gateway 260) to a remote EO 150 (similar to EO 250), or tandem office which then routes the E 9-1-1 call over the PSTN 300 to the PSAP 170 (similar to PSAP 270) serving the remote location 100. Suitably, the remote EO 150, or tandem office is provisioned with the DN of the PSAP 170 serving the remote location 100 such that E 9-1-1 calls received by the switch 152 are routed to the appropriate PSAP, namely, PSAP 170. Again, optionally, the switch 152 and gateway 160 combination is replaceable by a softswitch that acts as a functional equivalent of the combination.

Suitably, the designated local IP address for routing E 9-1-1 calls made from the remote CPE 110 identifies either the gateway 160 serving the remote EO 150 or its softswitch, as the case may be. Alternately, the PSAP 170 is IP enabled or capable, e.g., having its own IP address. In this case, the PSAP's IP address itself is used to directly deliver E 9-1-1 calls from the remote CPE 110 to the PSAP 170 via the IP network 310.

Upon receiving the E 9-1-1 call from the remote CPE 110, the remote PSAP 170 queries its ALI DB 172 to obtain information associated with the calling CPE 110, such as the geographic and/or physical location of the CPE 110 (i.e., a street address or other positional identification) and/or any other such relevant information. Optionally, if so equipped, the PSAP 170 may obtain the geographic location of the CPE 110 from its GPS 112, e.g., via a location information server that provides the location information from the GPS 112 to the ALI DB 172 along with the IP address of the remote CPE 110. Accordingly, by looking up the IP address from which the E 9-1-1 call originated in the ALI DB 172 the PSAP 170 obtains the corresponding location information for the CPE 110. In this manner, a proper response to the E 9-1-1 call can be quickly and readily coordinated. Notably, the proper PSAP 170 serving the remote location 100 handles the E 9-1-1 call as opposed to the home PSAP 270, and the geographic and/or physical location information correctly corresponds to the actual location of the CPE 110.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for routing emergency calls placed over a packet-switched network from a Customer Premises Equipment (CPE) at a remote location, the method comprising:
   (a) registering the CPE with a home Internet Service Provider (ISP) through a remote ISP that is providing the CPE access to the packet-switched network;
   (b) determining that the CPE is at a remote location;
   (c) obtaining a local Internet Protocol (IP) address that corresponds to a Public Safety Answering Point (PSAP) serving the remote location;
   (d) routing non-emergency calls to the home ISP for call processing; and,
   (e) handling emergency calls locally at the remote ISP in accordance with the obtained local IP address.

2. The method of claim 1, wherein step (a) includes sending a registration message from the CPE over the packet-switched network to the home ISP, and step (c) includes returning a response to the registration message from the home ISP to the remote ISP, said response including the local IP address.

3. The method of claim 1, wherein step (b) includes checking an originating IP address of the registering CPE to determine that the CPE is accessing the home ISP from the remote location.

4. The method of claim 1, wherein the CPE is provisioned with a Global Positioning System (GPS) that identifies its location, and step (b) includes obtaining the location of the CPE from its GPS.

5. The method of claim 1, wherein step (e) includes routing the emergency calls from the remote ISP over the packet-switched network to the local IP address such that they are ultimately connected to the PSAP serving the remote location.

6. The method of claim 5, wherein the PSAP is IP enabled, and the local IP address identifies the PSAP itself such that the emergency calls are routed over the packet-switch network to the PSAP.

7. The method of claim 5, wherein the local IP address identifies a gateway to which the emergency calls are routed over the packet-switched network, said gateway operatively connected to a telecommunications switch that routes the emergency calls over the PSTN to the PSAP serving the remote location.

8. The method of claim 5, wherein the local IP address identifies a softswitch to which the emergency calls are routed over the packet-switched network, said softswitch then routing the emergency calls over the PSTN to the PSAP serving the remote location.

9. A system for routing emergency calls placed over a packet-switched network from a Customer Premises Equipment (CPE) at a remote location, the system comprising:
   means for registering the CPE with a home Internet Service Provider (ISP) through a remote ISP that is providing the CPE access to the packet-switched network;
   means for determining that the CPE is at a remote location;
   means for obtaining a local Internet Protocol (IP) address that corresponds to a Public Safety Answering Point (PSAP) serving the remote location;
   means for routing non-emergency calls to the home ISP for call processing; and,
   means for handling emergency calls locally at the remote ISP in accordance with the obtained local IP address.

10. The system of claim 9, wherein the packet-switched network is an IP network.

11. The system of claim 9, wherein the CPE is a softphone running as an application on a computer.

12. The system of claim 9, wherein the CPE is operatively connected to the remote ISP via a remote access network.

13. The system of claim 12, wherein the remote access network is a Local Area Network (LAN).

14. The system of claim 9, wherein the CPE is provisioned with a Global Positioning System (GPS) that identifies its location.

15. A method of handling calls placed from an Internet Protocol (IP) telephone located at a remote location served by a first Public Safety Answer Point (PSAP) that is different from a second PSAP serving a home location, said handling including selectively routing calls via one of a home network at the home location and a remote network at the remote location, said remote network providing the IP telephone access to an IP network linking the home and remote networks, said method comprising:
   (a) sending a registration message from the IP telephone through the remote network over the IP network to the home network;
   (b) determining that the IP telephone is at a remote location;
   (c) obtaining an IP address local to the remote location that corresponds to the first PSAP;
   (d) defining a set of rules that differentiate calls into a first type of call and a second type of call;
   (d) handling the first type of calls locally at the remote network in accordance with the obtained local IP address; and,
   (e) routing the second type of calls to the home network for handling thereby.

16. The method of claim 15, wherein the first type of calls includes emergency 9-1-1 calls.

17. The method of claim 16, wherein the second type of calls includes non-emergency calls.

* * * * *